(12) United States Patent
Johnson et al.

(10) Patent No.: US 8,381,184 B2
(45) Date of Patent: Feb. 19, 2013

(54) DYNAMIC TEST COVERAGE

(75) Inventors: Sandra K. Johnson, Austin, TX (US); Sharad Mishra, Portland, OR (US); Joan L. Mitchell, Longmont, CO (US); Anil Kumar Thiramdas, Andhara Pradesh (IN); David Ward, Broomfield, CO (US)

(73) Assignee: International Business Machines Corporation, Armonk, NY (US)

( * ) Notice: Subject to any disclaimer, the term of this patent is extended or adjusted under 35 U.S.C. 154(b) by 1003 days.

(21) Appl. No.: 12/202,464

(22) Filed: Sep. 2, 2008

(65) Prior Publication Data

US 2010/0058295 A1 Mar. 4, 2010

(51) Int. Cl.
*G06F 9/44* (2006.01)

(52) U.S. Cl. ........................ 717/124; 717/120

(58) Field of Classification Search .................. 717/124
See application file for complete search history.

(56) References Cited

U.S. PATENT DOCUMENTS

| | | | |
|---|---|---|---|
| 6,078,189 A | 6/2000 | Noel | |
| 6,536,036 B1* | 3/2003 | Pavela | 717/125 |
| 6,918,106 B1 | 7/2005 | Burridge et al. | |
| 2005/0071818 A1* | 3/2005 | Reissman et al. | 717/127 |
| 2005/0114838 A1* | 5/2005 | Stobie et al. | 717/124 |
| 2005/0223357 A1* | 10/2005 | Banerjee et al. | 717/120 |
| 2005/0223361 A1* | 10/2005 | Belbute | 717/124 |
| 2005/0229161 A1 | 10/2005 | Wang et al. | |
| 2006/0101419 A1* | 5/2006 | Babcock | 717/130 |
| 2006/0218513 A1 | 9/2006 | Dozorets et al. | |
| 2007/0074156 A1 | 3/2007 | Nelson et al. | |
| 2009/0125290 A1* | 5/2009 | Chatterjee et al. | 703/13 |
| 2009/0138855 A1* | 5/2009 | Huene et al. | 717/125 |
| 2009/0144698 A1* | 6/2009 | Fanning et al. | 717/120 |
| 2009/0287729 A1* | 11/2009 | Chen et al. | 707/102 |
| 2009/0313607 A1* | 12/2009 | Harding et al. | 717/125 |

FOREIGN PATENT DOCUMENTS

| | | |
|---|---|---|
| JP | 62147534 | 7/1987 |
| JP | 1233632 | 9/1989 |
| JP | 2006338271 | 12/2006 |

OTHER PUBLICATIONS

Harder et al., "Improving Test Suites via Operational Abstraction", 2003, pp. 1-12, IEEE, Cambridge, MA, Proceedings of the 25th International Conference on Software Engineering (ICSE'03).
McMaster et al., "Call Stack Coverage for Test Suite Reduction", 2005, pp. 1-10, IEEE, College Park, MD, Proceedings of the 21st IEEE International Conference on Software Maintenance (ICSM'05).

* cited by examiner

*Primary Examiner* — Don Wong
*Assistant Examiner* — Theodore Hebert
(74) *Attorney, Agent, or Firm* — Yee & Associates, P.C.

(57) ABSTRACT

Dynamic test coverage to evaluate an artifact code is provided. Code of an artifact to be tested is identified. The code coverage of the test code is analyzed. The current coverage information is stored. Code coverage information for one or more prior versions of the test code is retrieved. The current coverage information is compared with the prior coverage information. Responsive to a determination that a difference between the current coverage information and the prior coverage information exists, the difference is collected. Responsive to a determination that test cases are to be generated automatically, generating, automatically, new test cases based on the difference. The new test cases are stored. Code coverage of the test code is analyzed based on the new test case. The new coverage information is stored. The new coverage information is sent to the user.

17 Claims, 4 Drawing Sheets

DYNAMIC TEST COVERAGE

BACKGROUND OF THE INVENTION

1. Field of the Invention

The present invention relates generally to a data processing system and more specifically, the present invention relates to a method, system, and computer program product for dynamic test coverage.

2. Background Description

Today, functional testers do not know the code coverage of a given test they are using on the code. Also, the combined results of many tests are unknown. The risks of shipping to customers newly tested code without some indication of the coverage of the tested code are hard to estimate. How much code a test covers is critical when a new function or functionality is added to the code late in the test cycle process and no new tests are added that are aimed at the new function. There is no way for the testers to know whether the new code actually got tested.

Code coverage information can be invaluable in determining how thoroughly a set of test cases exercises a program, known as an artifact. Insufficient testing is the primary reason programs fail and usually fail, at the worst possible time and place, such as at the customer's location during a critical production run.

BRIEF SUMMARY OF THE INVENTION

According to one embodiment of the present invention, code of an artifact to be tested is identified to select test code. The code coverage of the test code is analyzed to form current coverage information. The current coverage information is stored in a first repository. Code coverage information for one or more prior versions of the test code is retrieved from the first repository to form prior coverage information. The current coverage information is compared with the prior coverage information to form a comparison. Whether the comparison indicates a difference between the current coverage information and the prior coverage information is determined. Responsive to a determination that the comparison indicates a difference between the current coverage information and the prior coverage information, collecting the difference between the current coverage information and the prior coverage information to form a difference. Whether test cases are to be generated manually is determined. Responsive to a determination that test cases are not to be generated manually, generating, automatically, new test cases based on the difference. The new test cases are stored in a second repository. Code coverage of the test code is analyzed based on the new test case to form new coverage information. The new coverage information is stored in the first repository. The new coverage information is sent to the user.

DETAILED DESCRIPTION OF THE INVENTION

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, the present invention may take the form of a computer program product embodied in any tangible medium of expression having computer usable program code embodied in the medium.

Any combination of one or more computer usable or computer readable medium(s) may be utilized. The computer usable or computer readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer usable or computer readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer usable or computer readable medium may be any medium that can contain, store, communicate, propagate, or transport the program for use by or in connection with the instruction execution system, apparatus, or device. The computer usable medium may include a propagated data signal with the computer usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++, or the like and conventional procedural programming languages, such as the "C" programming language or similar programming languages. The program code may execute entirely on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
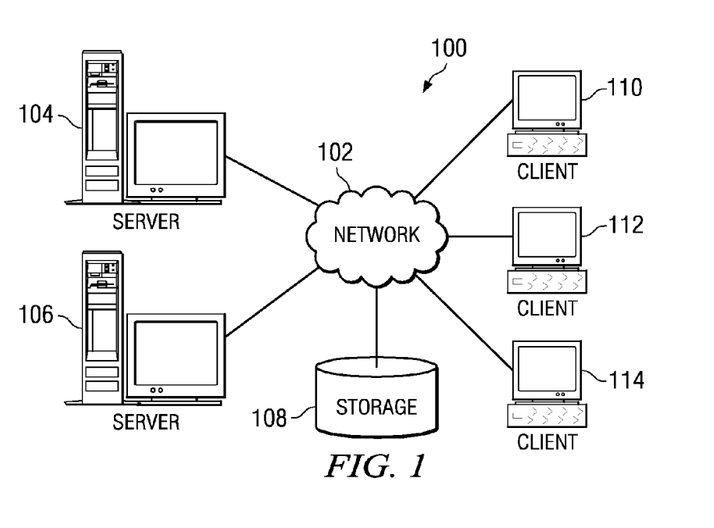
FIG. 1 depicts a pictorial representation of a network of data processing systems in which illustrative embodiments may be implemented.
Figure 2:
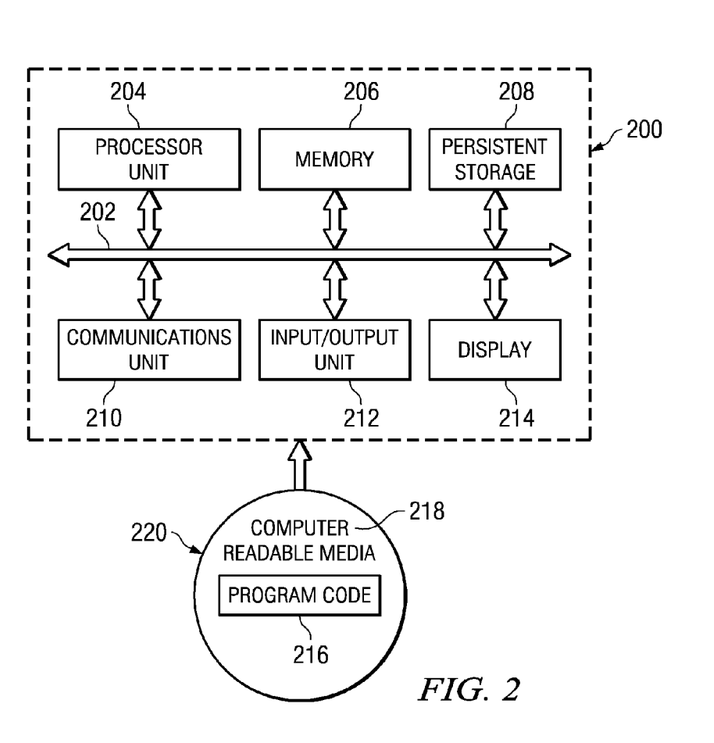
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer recordable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Exemplary embodiments provide for dynamic test coverage of code. Exemplary embodiments comprise several steps, including creating programs, referred to as artifacts or the code to be tested, and associated test scripts and test cases, referred to as test information, capturing test cases and other relevant information, code coverage analysis, engineering changes to artifacts, and manual or automatic test case generation. An artifact is code that is being tested or is to be tested. A use case is an example of how the code or artifact is being used. Capture means to look at the artifact in light of use cases, the different scenarios of how the artifact is used. Capturing test cases and other relevant information refers to collecting and storing specific code execution information along with the use case information that the code was executing on for future analysis. Capture is more sophisticated than a code trace. A capture looks at the execution steps of the code plus the context of execution. A code trace merely lists the instructions the code stepped through during execution. In addition, repositories contain information regarding code coverage, capture, and test case for various stages, versions, and so forth of the development, test, and support process.

Figure 3:
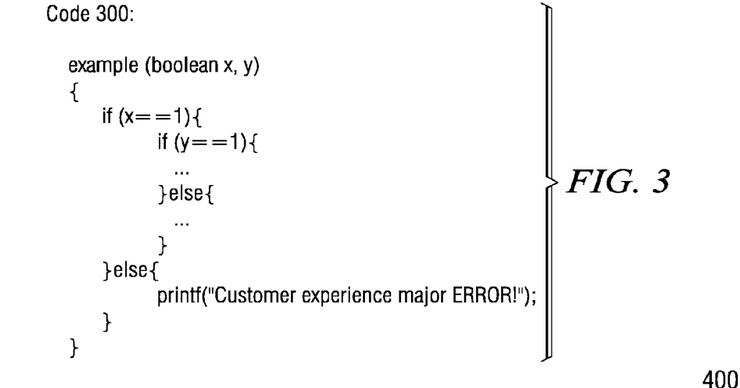
FIG. 3 is an example of an artifact.

FIG. 3 is an example of an artifact. Code 300 is an example of code sent to a customer. Within code 300 there are a total of three paths to travel through the code. The first path is where x=1 and y=1. The second path is where x=1 and y=0. The third path is where x=0.

Consider a test case where x=1 && y=1. This test case results in only a thirty-three percent (33%) test coverage as the test case only executes along one path of the product code. If code tested under these conditions are shipped to a customer, the customer running the program is likely to get the "Customer experience major ERROR!" error. A single unintended error condition can lead to expensive support calls, application downtime and reduced customer satisfaction. However, with time-to-market being critical to a product's profitability, software developers/testers are finding less time to complete exhaustive test coverage analysis on artifact(s) under test. This facilitates more software bugs being discovered by the customer, the customer being the consumer of the artifact at each phase of the artifact.

Automation of test coverage analysis on artifacts under test can improve significantly the productivity of the developer/tester due to the ability to repeat old tests, run new tests, and provide consistency to mundane tasks. Exemplary embodiments provide for automation of test coverage analysis on artifacts under test that employs code coverage information, automation, and an integrated test flow environment, which improves the developers/testers productivity and the quality of code received by the customer.

Figure 4:
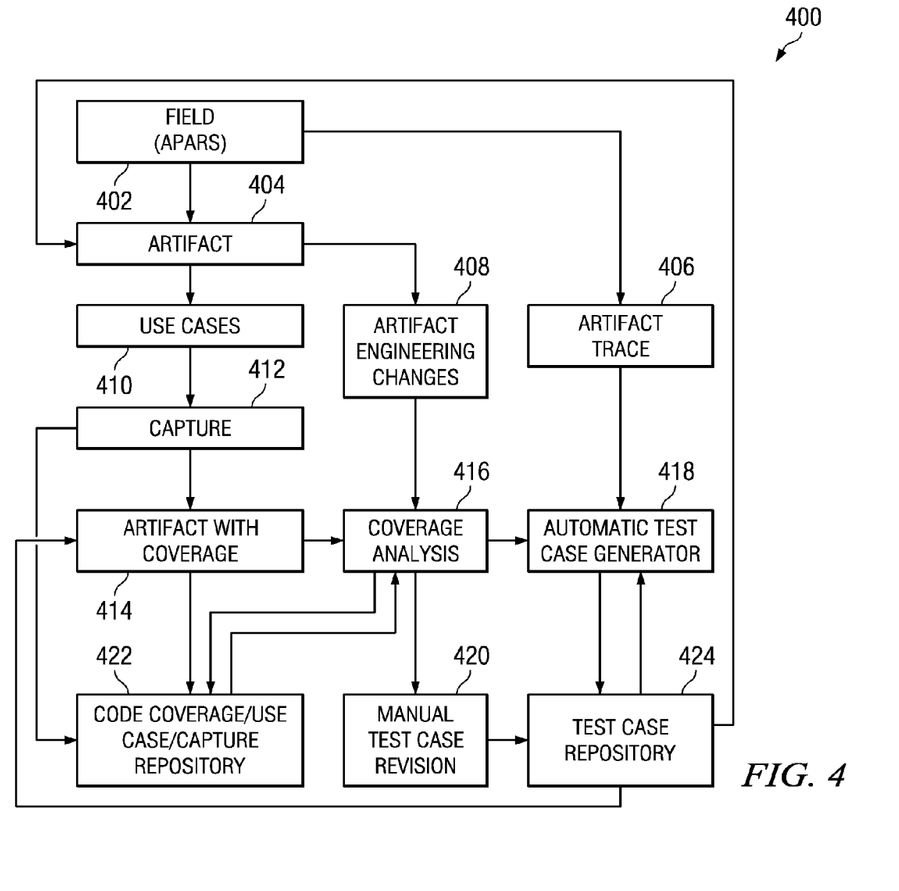
FIG. 4 is block diagram illustrating a system and information flow for dynamic test coverage in accordance with an exemplary embodiment.

FIG. 4 is a block diagram illustrating a system and information flow for dynamic test coverage in accordance with an exemplary embodiment. System 400 comprises components field APARS 402, artifact 404, artifact trace 406, artifact engineering changes 408, use cases 410, capture 412, artifact with coverage 414, coverage analysis 416, automatic test case generator 418, manual test case revision 420, code coverage/use case/capture repository 422, and test case repository 424. APARS stands for authorized program analysis reports. When a programmer or engineer is in the field and an error or problem occurs, the engineer generates an error report that triggers the tracking down of the problem. In the present exemplary embodiment, this error report is referred to as field APARS 402. Automatic test case generator 418 creates test cases that stimulate the environment without taking into account how to get the artifact in a state prior to execution. The same test case could be used for various capture test scripts where each test script enables different environments within the artifact. Artifact engineering changes 408 are all the changes made to an artifact. Code coverage/use case/capture repository 422 may be implemented as a single repository or separate repositories may be used for each of the code coverage/use case/capture. Further, a repository may comprise one or more distributed store devices.

Field APARS 402 identifies the artifact to be tested, artifact 404, and causes artifact trace 406 to be performed on artifact 404. Artifact trace 406 is sent to automatic test case generator 418 for use in generating new test cases. Use cases 410 are generated for artifact 404 and artifact engineering changes 408 are made. Capture 412 captures required data and/or user input to the test coverage analysis run in order to repeat the coverage analysis for future comparison runs. This can occur at various levels of abstraction, such as a script level, program state level, and so forth. Information captured by capture 412 is stored in code coverage/use case/capture repository 422. Artifact with coverage 414 is the base code plus information that specifies when portions of the code executed and what percentage of the code was touched during execution using use cases 410 and test information. Artifact with coverage 414 is stored in code coverage/use case/capture repository 422. Artifact with coverage 414 and artifact engineering changes 408 are used by coverage analysis 416 components to perform coverage analysis. Coverage analysis 416 is stored in code coverage/use case/capture repository 422. Coverage analysis 416 comprises looking at the code and calculates code coverage percentage. A user is able to set the level of detail analyzed in the coverage analysis. Code coverage analysis points to the specific portions of code touched during execution as well as the coverage percentage. Code coverage analysis 416 is sent to automatic test case generator 418, which uses the code coverage analysis to automatically generate new test cases. In the case where the test information is to be revised manually, code coverage analysis 416 is sent to manual test case revision 420. New or revised test cases are stored in test case repository 424. Automatic test case generator 418 also pulls test information from test case repository 424 when generating new test cases and test information.

Figure 5:
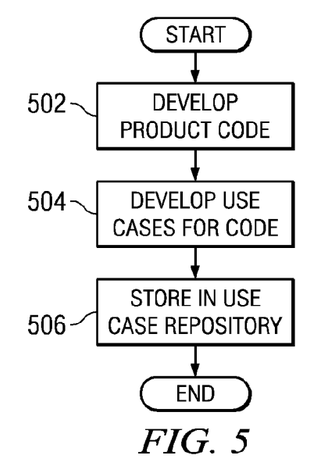
FIG. 5 is a flowchart illustrating the operation of populating a use case repository in accordance with an exemplary embodiment.

FIG. 5 is a flowchart illustrating the operation of populating a use case repository in accordance with an exemplary embodiment. The operation of FIG. 5 may be implemented in a data processing system, such as data processing system 200 in FIG. 2. The operation begins with the development of the product code (step 502). Use cases are then developed for the product code (step 504). The use cases are then stored in the use case repository (step 506) and the operation ends.

Figure 6:
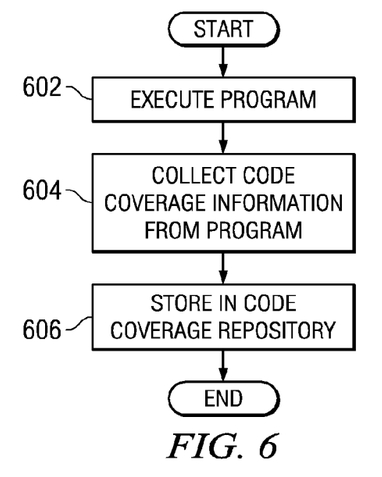
FIG. 6 is a flowchart illustrating the operation of populating a code coverage repository in accordance with an exemplary embodiment.

FIG. 6 is a flowchart illustrating the operation of populating a code coverage repository in accordance with an exemplary embodiment. The operation of FIG. 6 may be implemented in a data processing system, such as data processing system 200 in FIG. 2. The operation begins when a program is executed (step 602). Coverage information is collected from the program (step 604). The code coverage information is stored in code coverage repository (step 606) and the operation ends.

Figure 7:
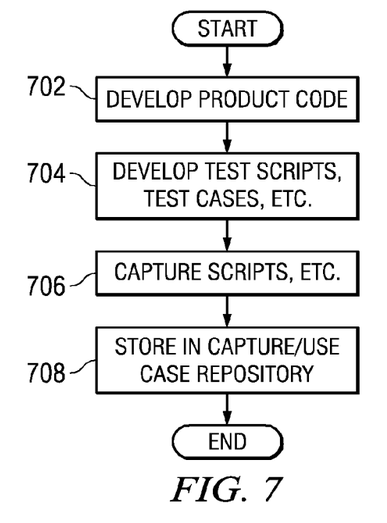
FIG. 7 is a flowchart illustrating the operation of populating a capture repository in accordance with an exemplary embodiment.

FIG. 7 is a flowchart illustrating the operation of populating a capture repository in accordance with an exemplary embodiment. The operation of FIG. 7 may be implemented in a data processing system, such as data processing system 200 in FIG. 2. The operation begins when the product code is developed (step 702). Test information, such as test cases, test scripts, and so forth are developed (step 704). The developed test information is captured (step 706). The captured test information is stored in a capture repository (step 708) and the operation ends.

Figure 8:
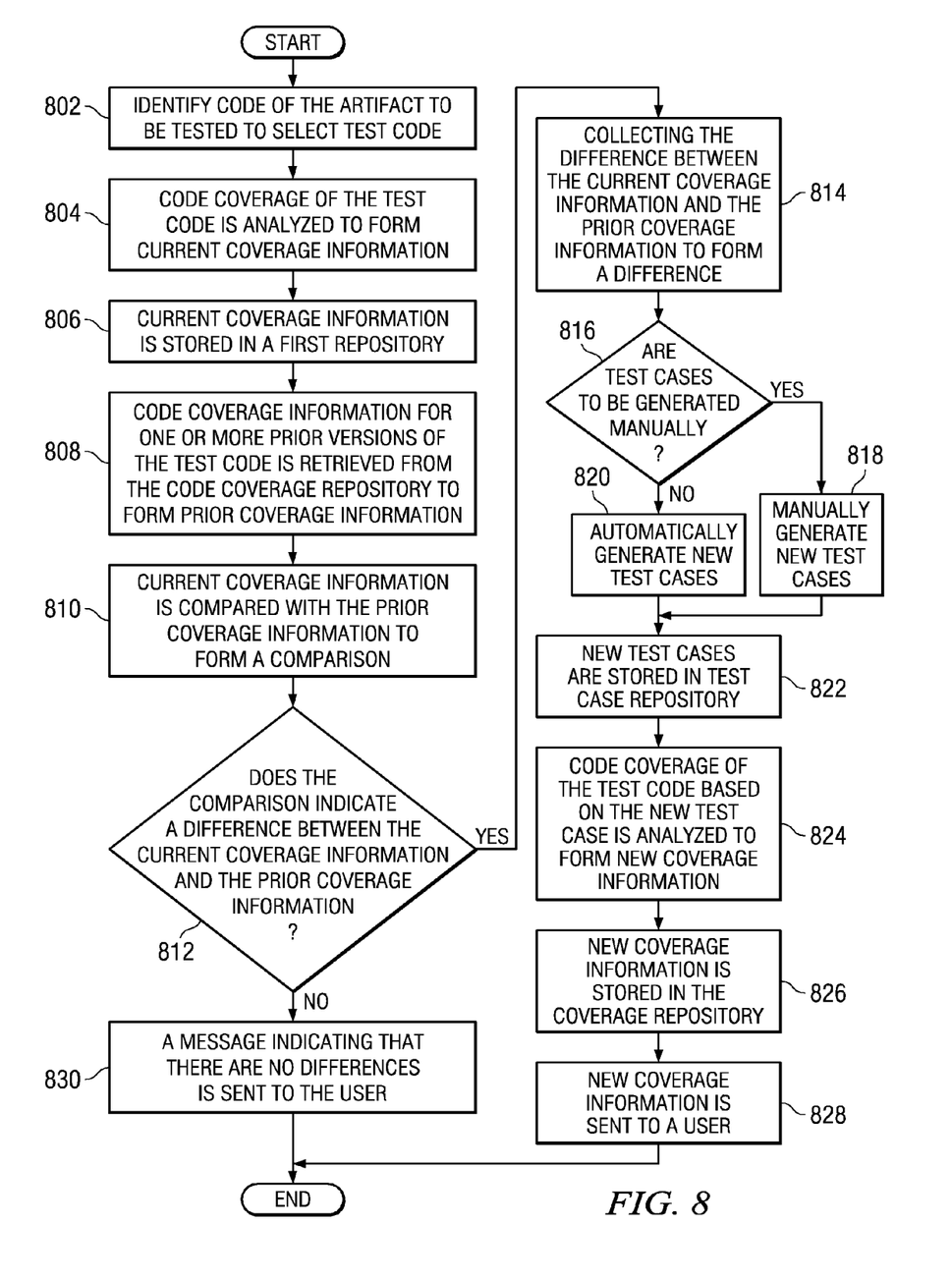
FIG. 8 is a flowchart illustrating the operation of dynamic test coverage to evaluate an artifact in accordance with an exemplary embodiment.

FIG. 8 is a flowchart illustrating the operation of dynamic test coverage to evaluate an artifact in accordance with an exemplary embodiment. The operation of FIG. 8 may be implemented in a data processing system, such as data processing system 200 in FIG. 2. The operation begins by identifying code of the artifact to be tested to select test code (step 802). Code coverage of the test code is analyzed to form current coverage information (step 804). The current coverage information is stored in a first repository (step 806).

In an alternate embodiment, use case information for one or more prior versions of the test code is retrieved from the use case repository and used in analyzing the code coverage of the test code. Code coverage information for one or more prior versions of the test code is retrieved from the code coverage repository to form prior coverage information (step 808). The current coverage information is compared with the prior coverage information to form a comparison (step 810).

A determination of whether the comparison indicates a difference between the current coverage information and the prior coverage information is made (step 812). Responsive to a determination that the code comparison does not indicate any difference between the current coverage information and the prior coverage information (a no output to step 812), a message indicating that there are no differences is sent to the user (step 830) and the operation ends.

Responsive to a determination that the comparison indicates a difference between the current coverage information and the prior coverage information (a yes output to step 812), collecting the difference between the current coverage information and the prior coverage information to form a difference (step 814). The code coverage analysis component determines the differences. The next step determines whether test cases are to be generated manually (step 816). Responsive to a determination that test cases are to be generated manually (a yes output to step 816), manually generate new test cases (step 818). Responsive to a determination that test cases are not to be generated manually (a no output to step 816), automatically generate new test cases (step 820). Regardless of whether new test cases are generated manually or automatically, test information for one or more prior versions of the test code is retrieved from the test case repository and used in conjunction with the differences to generating the new test cases.

The new test cases are stored in test case repository (step 822). Code coverage of the test artifact based on the new test case is analyzed to form new coverage information (step 824). The new coverage information is stored in the coverage repository (step 826). The new coverage information is sent to a user (step 828) and the operation ends.

Thus, exemplary embodiments provide a repeatable, consistent, tunable process for dynamic test coverage using a set of components centered around a code coverage analysis tool. There are several threads of code coverage analysis to allow for incremental improvements based on code coverage analysis which can lead to better code quality. Each thread can be fine-tuned to maximize the developer/tester productivity and knowledge of problem areas at each phase in the test flow process. Moreover, intelligent risk analysis can be performed by product managers to mitigate risks associated with untested code being released to the customer.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for dynamic test coverage to evaluate an artifact, the computer implemented method comprising:
   identifying, using an error report, code of the artifact to be tested to form test code, wherein the error report was generated in response to an occurrence of an error;
   causing, by the error report, a code trace to be performed on the test code to generate a trace;
   analyzing code coverage of the test code to form current coverage information;
   storing the current coverage information in a first repository;
   retrieving code coverage information for a plurality of prior versions of the test code from the first repository to form prior coverage information, wherein the prior coverage information includes information about when one of the plurality of prior versions of the test code executed and what percentage of the one of the plurality of prior versions of the test code was touched during execution;
   comparing the current coverage information with the prior coverage information to form a comparison;
   determining whether the comparison indicates a difference between the current coverage information and the prior coverage information;
   responsive to a determination that the comparison indicates a difference between the current coverage information and the prior coverage information, collecting the difference between the current coverage information and the prior coverage information to form a difference;
   generating, by a test case generator, new test cases based on the trace and the difference, wherein the test case generator received the trace;
   storing the new test cases in a second repository;
   analyzing code coverage of the test code based on the new test case to form new coverage information;
   storing the new coverage information in the first repository; and
   sending the new coverage information to the user.

2. The computer implemented method of claim 1, further comprising:
   responsive to a determination that the comparison does not indicate any difference between the current coverage information and the prior coverage information, sending a message to a user indicating that there are no differences.

3. The computer implemented method of claim 1, further comprising:
   creating a use case for test code; and
   storing the use case in a third repository.

4. The computer implemented method of claim 3, further comprising:
   retrieving the use case from the third repository;

executing test code based on the use case to form test information;

capturing the test information; and analyzing the test information to form coverage information.

5. The computer implemented method of claim 1, wherein the first and second repository are the same repository.

6. The computer implemented method of claim 1, further comprising:

identifying, based on the current coverage information, portions of the test code that did not execute, forming non-covered code; and creating code to test the non-covered code.

7. A computer program product for dynamic test coverage to evaluate an artifact, the computer program product comprising:

one or more computer-readable tangible storage devices;

program instructions, stored on at least one of the one or more storage devices, to identify, using an error report, code of the artifact to be tested to form test code, wherein the error report was generated in response to an occurrence of an error;

program instructions, stored on at least one of the one or more storage devices, to cause, by the error report, a code trace to be performed on the test code to generate a trace;

program instructions, stored on at least one of the one or more storage devices, to analyze code coverage of the test code to form current coverage information;

program instructions, stored on at least one of the one or more storage devices, to store the current coverage information in a first repository;

program instructions, stored on at least one of the one or more storage devices, to retrieve code coverage information for a plurality of prior versions of the test code from the first repository to form prior coverage information, wherein the prior coverage information includes information about when one of the plurality of prior versions of the test code executed and what percentage of the one of the plurality of prior version of the test code was touched during execution;

program instructions, stored on at least one of the one or more storage devices, to compare the current coverage information with the prior coverage information to form a comparison;

program instructions, stored on at least one of the one or more storage devices, to determine whether the comparison indicates a difference between the current coverage information and the prior coverage information;

program instructions, stored on at least one of the one or more storage devices, responsive to a determination that the comparison indicates a difference between the current coverage information and the prior coverage information, to collect the difference between the current coverage information and the prior coverage information to form a difference;

program instructions, stored on at least one of the one or more storage devices, to generate, by a test case generator, new test cases based on the trace and the difference, wherein the test case generator received the trace;

program instructions, stored on at least one of the one or more storage devices, to store the new test cases in a second repository;

program instructions, stored on at least one of the one or more storage devices, to analyze code coverage of the test code based on the new test case to form new coverage information;

program instructions, stored on at least one of the one or more storage devices, to store the new coverage information in the first repository; and program instructions, stored on at least one of the one or more storage devices, to send the new coverage information to the user.

8. The computer program product of claim 7, further comprising:

program instructions, stored on at least one of the one or more storage devices, responsive to a determination that the comparison does not indicate any difference between the current coverage information and the prior coverage information, to send a message to a user indicating that there are no differences.

9. The computer program product of claim 7, further comprising:

program instructions, stored on at least one of the one or more storage devices, to create a use case for test code; and program instructions, stored on at least one of the one or more storage devices, to store the use case in a third repository.

10. The computer program product of claim 9, further comprising;

program instructions, stored on at least one of the one or more storage devices, to retrieve the use case from the third repository;

program instructions, stored on at least one of the one or more storage devices, to execute test code based on the use case to form test information;

program instructions, stored on at least one of the one or more storage devices, to capture the test information; and program instructions, stored on at least one of the one or more storage devices, to analyze the test information to form coverage information.

11. The computer program product of claim 7, wherein the first and second repository are the same repository.

12. The computer program product of claim 7, further comprising:

program instructions, stored on at least one of the one or more storage devices, to identify, based on the current coverage information, portions of the test code that did not execute, forming non-covered code; and program instructions, stored on at least one of the one or more storage devices, to create code to test the non-covered code.

13. A data processing system dynamic test coverage to evaluate an artifact, the data processing system comprising:

a bus;

a storage device connected to the bus, wherein the storage device contains computer usable code; and a processing unit connected to the bus, wherein the processing unit executes the computer usable code to identify, using an error report, code of the artifact to be tested to form test code, wherein the error report was generated in response to an occurrence of an error; cause, by the error report, a code trace to be performed on the test code to generate a trace; analyze code coverage of the test code to form current coverage information; store the current coverage information in a first repository; retrieve code coverage information for a plurality of prior versions of the test code from the first repository to form prior coverage information, wherein the prior coverage information includes information about when the one of the plurality of prior versions of the test code executed and what percentage of the one of the plurality of prior versions of the test code was touched during execution; compare the current coverage information with the prior coverage information to form a comparison; determine whether the comparison indicates a difference between the current coverage information and the prior coverage information; responsive to a determination that the comparison indicates a difference between the current coverage information and the prior coverage information, collect the difference between the current coverage information and the prior coverage information to form a difference; generate, by a test case generator, new test cases based on the trace and the difference, wherein the test case generator received the trace; store the new test cases in a second repository; analyze code coverage of the test code based on the new test case to form new coverage information; store the new coverage information in the first repository; and send the new coverage information to the user.

14. The data processing system of claim 13, wherein the processor further executes the computer usable program code to, responsive to a determination that the comparison does not indicate any difference between the current coverage information and the prior coverage information, send a message to a user indicating that there are no differences.

15. The data processing system of claim 13, wherein the processor further executes the computer usable program code to create a use case for test code; and store the use case in a third repository.

16. The data processing system of claim 15 wherein the processor further executes the computer usable program code to retrieve the use case from the third repository; execute test code based on the use case to form test information; capture the test information; and analyze the test information to form coverage information.

17. The data processing system of claim 13, wherein the processor further executes the computer usable program code to identify, based on the current coverage information, portions of the test code that did not execute, forming non-covered code; and create code to test the non-covered code.

* * * * *